United States Patent [19]

Kal

[11] Patent Number: 5,720,781
[45] Date of Patent: Feb. 24, 1998

[54] METHOD FOR MANUFACTURING AN ELECTRODE OF THE LITHIUM BATTERY

[75] Inventor: Myoung-Jun Kal, Seoul, Rep. of Korea

[73] Assignee: Daewoo Electronics Co., Ltd., Seoul, Rep. of Korea

[21] Appl. No.: 686,724

[22] Filed: Jul. 26, 1996

[30] Foreign Application Priority Data

Jul. 28, 1995 [KR] Rep. of Korea .................. 95-22712

[51] Int. Cl.$^6$ ................................................. H01M 6/00
[52] U.S. Cl. ................................................... 29/623.5
[58] Field of Search ......................... 29/623.5, 2; 419/68, 419/69; 429/94; 72/127, 135; 242/441.1, 441.3

[56] References Cited

U.S. PATENT DOCUMENTS

| | | | |
|---|---|---|---|
| 4,975,095 | 12/1990 | Strickland et al. | 29/623.1 |
| 5,021,306 | 6/1991 | Sauer et al. | 429/94 |
| 5,158,722 | 10/1992 | Ilic et al. | 264/40.1 |
| 5,380,606 | 1/1995 | Itou et al. | 429/194 |
| 5,443,925 | 8/1995 | Machida et al. | 429/94 |

FOREIGN PATENT DOCUMENTS

| | | |
|---|---|---|
| 0 334 251 | 9/1989 | European Pat. Off. . |
| 195 32 626 | 3/1996 | Germany . |
| 2 122 413 | 1/1984 | United Kingdom . |

OTHER PUBLICATIONS

Patent Abstracts of Japan, pub. No. JP-2087462, vol. 14, No. 273, ab. date Jun. 1990.

Primary Examiner—Anthony Skapars

[57] ABSTRACT

A battery which can reduce the manufacturing steps, reduce the waste of material, and prevent a short during the winding process, and a manufacturing method of the winding assembly of the above battery, are disclosed. A metal sheet having an expanded metal and an electrode lead, which is integrally formed with the expanded metal is provided. A reactive material which reacts with an electrolyte to generate current, is applied to recesses of two mold blocks. Then, a first electrode section is formed by positioning the metal sheet between the mold blocks, pressure-molding the metal sheet, and applying the reactive material to the expanded metal. A stacked structure obtained by interposing a separator, which is a thin metal plate having a same size as the expanded metal, between the first electrode section and a second electrode section. The structure is then wound outwards to obtain a winding assembly. The quantity of raw material, the number of components of the battery, and the number of manufacturing steps are all reduced. Further, a short in the winding assembly during the winding step is prevented.

7 Claims, 7 Drawing Sheets

5,720,781

1

METHOD FOR MANUFACTURING AN ELECTRODE OF THE LITHIUM BATTERY

BACKGROUND OF THE INVENTION

1. Field of the Invention

The present invention relates to a lithium battery, and more particularly to a lithium battery having a winding assembly which can be easily manufactured so that the materials and the manufacturing steps thereof are reduced and a short which may occur during the manufacturing of the winding assembly is prevented.

2. Description of the Prior Art

A lithium battery is generally used as an electric power source for a portable device such as a camcorder or the like since the battery is easy to carry and is easy to mount on the device. The lithium battery comprises lithium metal as a cathode active material, and manganese dioxide as an anode active material. The lithium battery also includes an electrolyte which includes an inorganic electrolyte dissolved in a nonaqueous solution comprised of propylene carbonate. FIG. 1 is an exploded perspective view which shows a conventional lithium battery. FIG. 2 is a cross sectional view which shows an assembled state of the battery shown in FIG. 1. FIG. 3 is an enlarged cross sectional view of portion A in FIG. 2. As shown in FIGS. 1 and 2, a lithium battery 100 has a case 60. A bending portion 62 is formed at an upper portion of case 60 and an electrolyte 70 is filled in case 60 below bending portion 62. Current is generated by a chemical reaction of electrolyte 70, thereby being applied to a load through an anode lead 51 and a cathode lead 52. With reference to FIG. 2, cathode lead 52 is bent to make contact with the inner bottom surface of case 60. A cover 30 is formed at an upper inner portion of case 60, which has a through hole 31 formed at the central portion thereof. Anode lead 51 is bent to make contact with cover 30. A ring plate 33 which is comprised of a plastic material, and an aluminum foil 32 are stacked in cover 30. In the case of an explosion of electrolyte 70, aluminum foil 32 is easily torn so that the gases generated by the explosion are vented.

As shown in FIGS. 2 and 3, a positive temperature coefficient (PTC) thermistor 20 is positioned on cover 30. The resistance of PTC thermistor 20 approaches infinity if the temperature rises above a predetermined value, e.g., 80 degree Celsius. An opening 21 corresponding to through hole 31 of cover 30 is formed at the center of PTC thermistor 20. When the temperature of electrolyte 70 rises above the predetermined value, the resistance of PTC thermistor 20 approaches infinity and the current is cut off. A cap 10 which functions as an anode terminal is positioned on PTC thermistor 20. A vent hole 11 is formed at the center of cap 10. PTC thermistor 20 is comprised of a mixture of various metals. If the temperature of electrolyte 70 rises above 80 degree Celsius, the resistance of PTC thermistor 20 approaches infinity, thereby causing the current to be cut off.

As shown in detail in FIG. 3, a gasket 40 for sealing the interior of case 60 is provided between the inner surface of case 60 and stacked cap 10, PTC thermistor 20, and cover 30, and surrounds stacked cap 10, PTC thermistor 20, and cover 30. Case 60 is comprised of a conductive metal, and makes contact with cathode lead 52 so as to function as a cathode terminal. The upper end of case 60 is bent towards the interior of case 60, so that gasket 40 is fixed at a position between case 60 and stacked cap 10, PTC thermistor 20, and cover 30.

Winding assembly 50 in case 60 chemically reacts with electrolyte 70 in case 60, thereby generating current. Winding assembly 50 in case 60 is wound outwards and has either a spiral shape or a cylindrical shape. In the lithium battery, it is generally necessary to make the reaction area as large as possible to obtain a relatively high voltage. Winding assembly 50, which is comprised of a metal sheet coated with a material thereon which reacts with electrolyte 70, is wound outwards to maximize the reaction area with electrolyte 70, and has either a spiral shape or a cylindrical shape. Winding assembly 50 is manufactured by coating a mixture which has been obtained by mixing manganese dioxide and carbon by means of a binder, on an expanded metal, which is either a metal net or a slitted metal sheet. Current is generated by the reaction of winding assembly 50 with electrolyte 70, and is applied to a load via anode and cathode leads 51 and 52.

By using lithium battery 100 as above, current is generated by the reaction of winding assembly 50 with electrolyte 70, and the current generated in this manner is applied to a portable electrical device through anode and cathode leads 51 and 52. In lithium battery 100, there is a possibility of explosion of electrolyte 70 due to high temperature or to an external shock. At this time, aluminum foil 33 is torn so that the expanded gases can be exhausted outside case 60 through both through hole 31 of PTC thermistor 20 and vent hole 11 of cap 10.

FIG. 4 is an exploded perspective view for showing a manufacturing process of the winding assembly of a conventional lithium battery. Winding assembly 50 is manufactured by using an expanded metal comprised of either a thin metal net such as a thin net-shaped film of aluminum or a thin slitted sheet of an aluminum as an anode. A reactive material 82 is adhered to both surfaces of expanded metal 81. Reactive material 82 is a mixture of manganese dioxide and carbon. Reactive material 82 is attached to expanded metal 81 by a binder. Expanded metal 81, to which reactive material 82 is adhered, is pressed by a roller so as to have a predetermined thickness, and is cut into a predetermined size. Then, anode lead 51 is attached to expanded metal 81, thereby completing the anodic electrode. Thereafter, cathodic electrode is formed by using a lithium metal sheet, and is stacked on top of the anodic electrode along with a porous polypropylene film, which is placed in between the anodic electrode and the cathodic electrode. The stacked structure is spirally wound so as to form winding assembly 50.

During the manufacturing process of winding assembly 50, reactive material 82 is partially removed so as to attach anode lead 51 for applying electric current to a load. That is, anode lead 51 is electrically insulated from expanded metal 81 unless reactive material 82 on the portion of expanded metal 81 where the anode lead 51 is to be attached, is removed. Therefore, when an electrode lead is attached to expanded metal 81, reactive material 82 should be partially removed from the area where the electrode lead is to be attached. Anode lead 51 is attached by a welding method to the portion of expanded metal where reactive material is removed so as to be exposed. Anode lead 51 is a thin rectangular shaped sheet. After attaching anode lead 51 to expanded metal 81, anode lead 51 is fixed by using a tape 83, thereby completing a metal anode structure. The anode metal structure obtained in this manner and the lithium sheet cathode are stacked by interposing a separator between them in such a manner that the electrode leads are opposingly disposed, and then the stacked structure is wound so as to complete winding assembly 50. Then, winding assembly 50 is placed in case 60, and electrolyte 70 is filled in case 60. Winding assembly 50 chemically reacts with electrolyte 70 in case 60, thereby generating current. Winding assembly 50 is placed in case 60 in such a way as to have as large a reaction area as possible, in order to obtain a relatively high voltage. Thus, in order to increase the reaction area of winding assembly 50 and electrolyte, 70, an electrode unit is wound outwards by sandwitching a separator film so as to have a spiral shape when observed from the plan view.

When manufacturing the conventional winding assembly, the reactive material on some portion of the expanded metal should be partially removed so as to attach the anode lead to the expanded metal. Therefore, the expanded metal can be damaged when the reactive material is removed. If the expanded metal is damaged, a short occurs in the winding assembly. Further, since the electrode lead is attached to the expanded metal by welding or the like, the manufacturing process of the winding assembly is very complicated. Lastly, since the anode lead is attached to the winding assembly, the winding assembly cannot be wound precisely. In case that the winding assembly is not wound as precisely as required, the electrode lead may be separated from the expanded metal, thereby causing a short.

A lithium battery which comprises the above-mentioned winding assembly, i.e., a spiral electrode unit, is disclosed in U.S. Pat. No. 5,443,925 issued to Toyoji Machinda et. al. on Aug. 22, 1995. The battery has a simple connection structure. In the lithium of Toyoji Machinda, the spiral electrode unit, which comprises an anodic electrode, a cathodic electrode, and a separator inserted between the anodic electrode and an electrolyte filled in the case, is fixed in an aluminum case. An anode active material which comprises a lithium composite is adhered to the anodic electrode. Also, the anodic electrode is supported by an anodic electrode supporting device comprised of an aluminum foil. The cathodic electrode comprises a carbonic composite which can receive or emit lithium ions. A portion of the outer surface of the cathodic electrode supporting device is exposed. The exposed portion of the outer surface makes contact with the inner surface of the outer case. The outer winding of the cathode active material, except for the exposed portion, is assembled in the same manner that the spiral electrode unit is assembled.

In the battery of Toyoji Machinda, the spiral electrode unit is pressed in the opposite direction so that the distance between the anodic electrode and the cathodic electrode becomes shorter and the contacting area becomes larger. Therefore, the battery of Tag Machina can reduce the interior resistance at the beginning of electrical discharge, and can also improve the electrical characteristics.

In addition, U.S. Pat. No. 5,380,606 discloses a battery which is manufactured by using $LiCoO_2$ as an anode active material on both sides of an aluminum foil, graphite as a conductive agent, and N-methyl-2-pyrrolidon as a binder Nevertheless, in the above-mentioned batteries, the manufacturing processes of the batteries are complicated. Further, the batteries still have most of the disadvantages of the conventional batteries.

SUMMARY OF THE INVENTION

Therefore, it is a first object of the present invention to provide a battery which can reduce the manufacturing steps, reduce the waste of material, and prevent a short during the winding process.

It is a second object of the present invention to provide a manufacturing method of the winding assembly according to the present invention.

In order to achieve the first object of the present invention, there is provided a battery comprising: a case for containing an electrolyte therein; and a winding assembly which is provided in the case, the winding assembly including i) a first electrode section having a first metal sheet wherein an expanded metal and an electrode lead are integrally formed with each other, and having an active material attached to both sides of the expanded metal, ii) a second electrode section which has a second metal sheet corresponding to the first metal sheet, and iii) a separator which is provided between the first electrode section and the second electrode section.

In order to achieve the second object of the present invention, there is provided a method of manufacturing a battery, comprising of the steps of:

providing a metal sheet having an expanded metal and an electrode lead which is integrally formed with the expanded metal;

applying a reactive material which reacts with an electrolyte to generate current, to recesses of two mold blocks, wherein each of the recesses correspond to the expanded metal;

forming a first electrode section by positioning the metal sheet between the mold blocks, pressure-molding the metal sheet, and applying the reactive material to the expanded metal; and manufacturing a winding assembly by winding a stacked structure obtained by interposing a separator, which is a thin metal plate having a same size as the expanded metal to which the reactive material is adhered, between the first electrode section and a second electrode section.

After adhering the reactive material to the expanded metal, the expanded metal is pressed by using rollers so as to have a uniform thickness. At this time, the metal sheet is pressed by inserting the metal sheet between a pair of rollers which are rotated.

A heater such as an electrical coil is provided in each of the mold blocks so that heat from the heater is transferred to the metal sheet during the pressure-molding in order that the reactive material adheres to the metal sheet.

The winding assembly is manufactured by forming an expanded metal to which an electrode lead is integrally formed, and then applying a reactive material to the expanded metal. Thus, the quantity of raw material (such as a reactive material), the number of components of the battery, and the numbers of manufacturing steps are all reduced. Further, a short in the winding assembly during the winding step is prevented.

BRIEF DESCRIPTION OF THE DRAWINGS

The above object and other advantages of the present invention will become more apparent by describing in detail a preferred embodiment thereof with reference to the attached drawings, in which.

DETAILED DESCRIPTION OF THE PREFERRED EMBODIMENT

Hereinafter, a preferred embodiment of the present invention will be described in detail with reference to the accompanying drawings.

Figure 1:
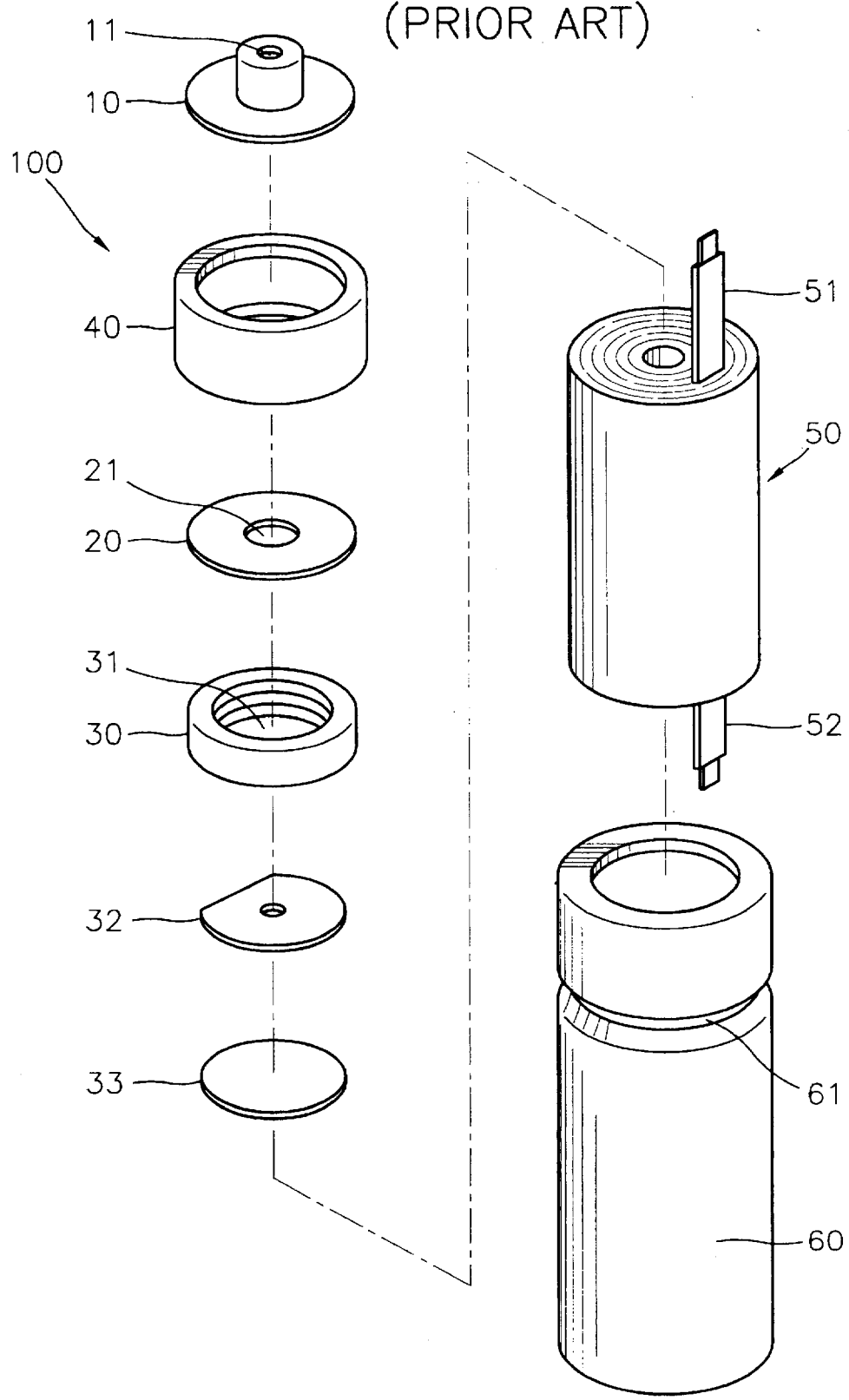
FIG. 1 is an exploded perspective view of a conventional lithium battery.
Figure 2:
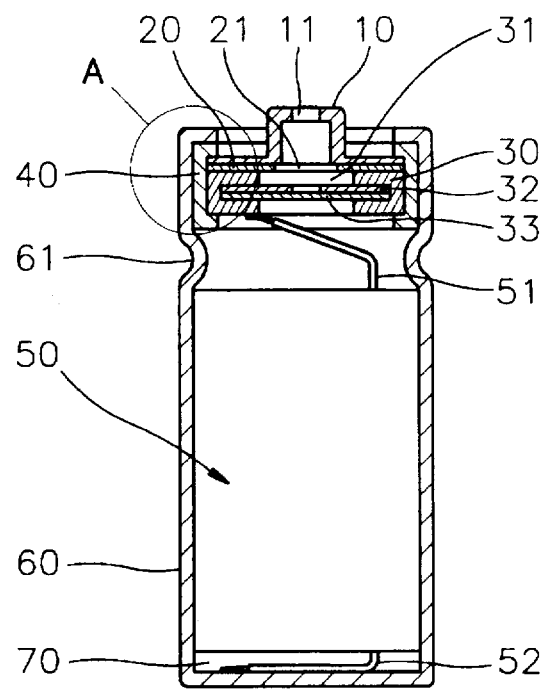
FIG. 2 is a cross sectional view showing the assembled state of the battery shown in FIG. 1.
Figure 3:
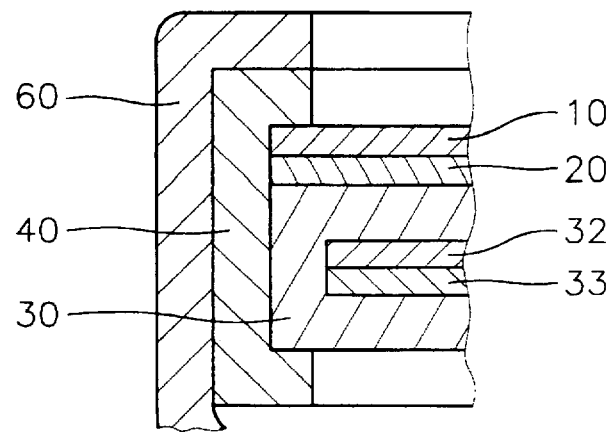
FIG. 3 is an enlarged cross sectional view of portion A shown in FIG. 2.
Figure 4:
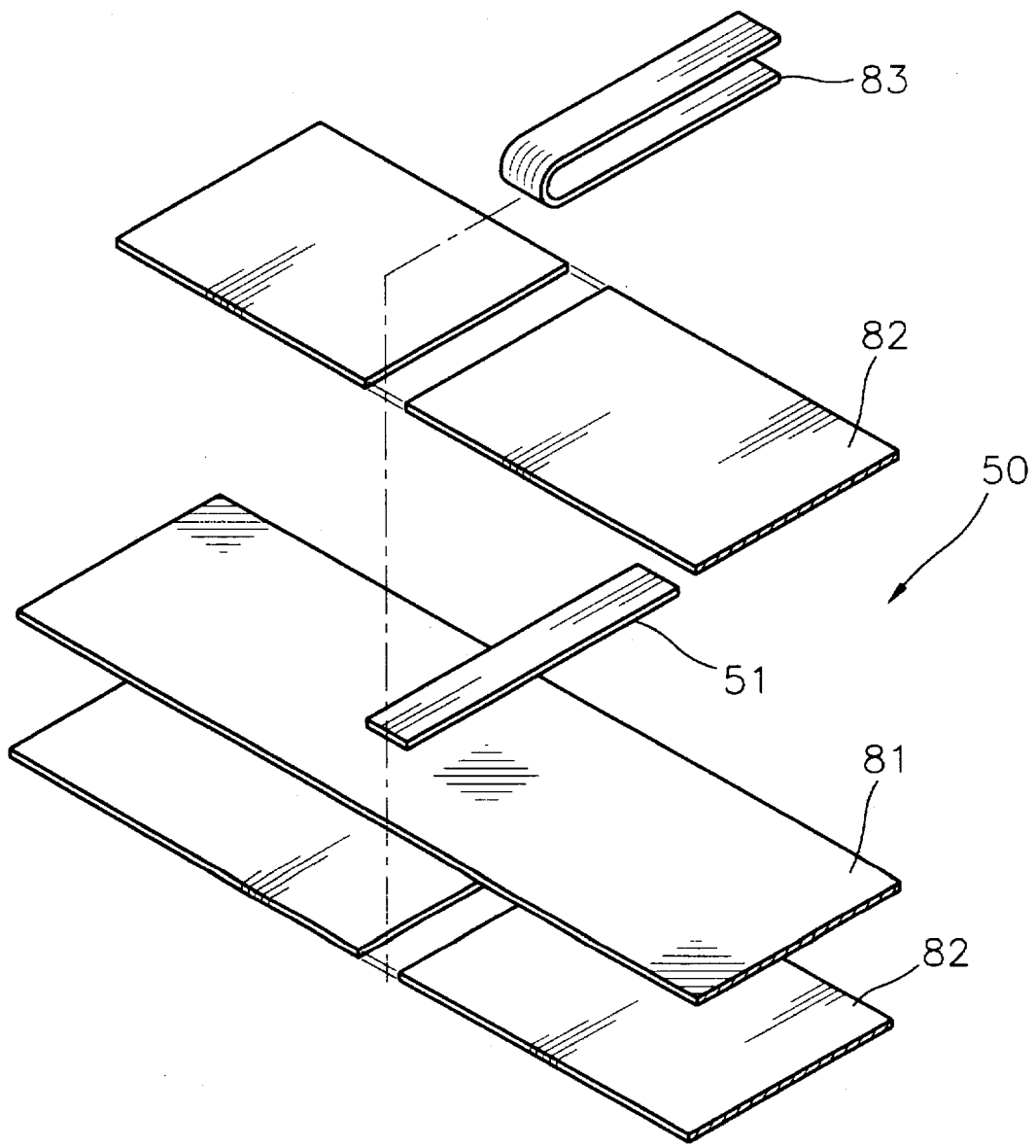
FIG. 4 is a perspective view of a winding assembly of the conventional lithium.
Figure 5:
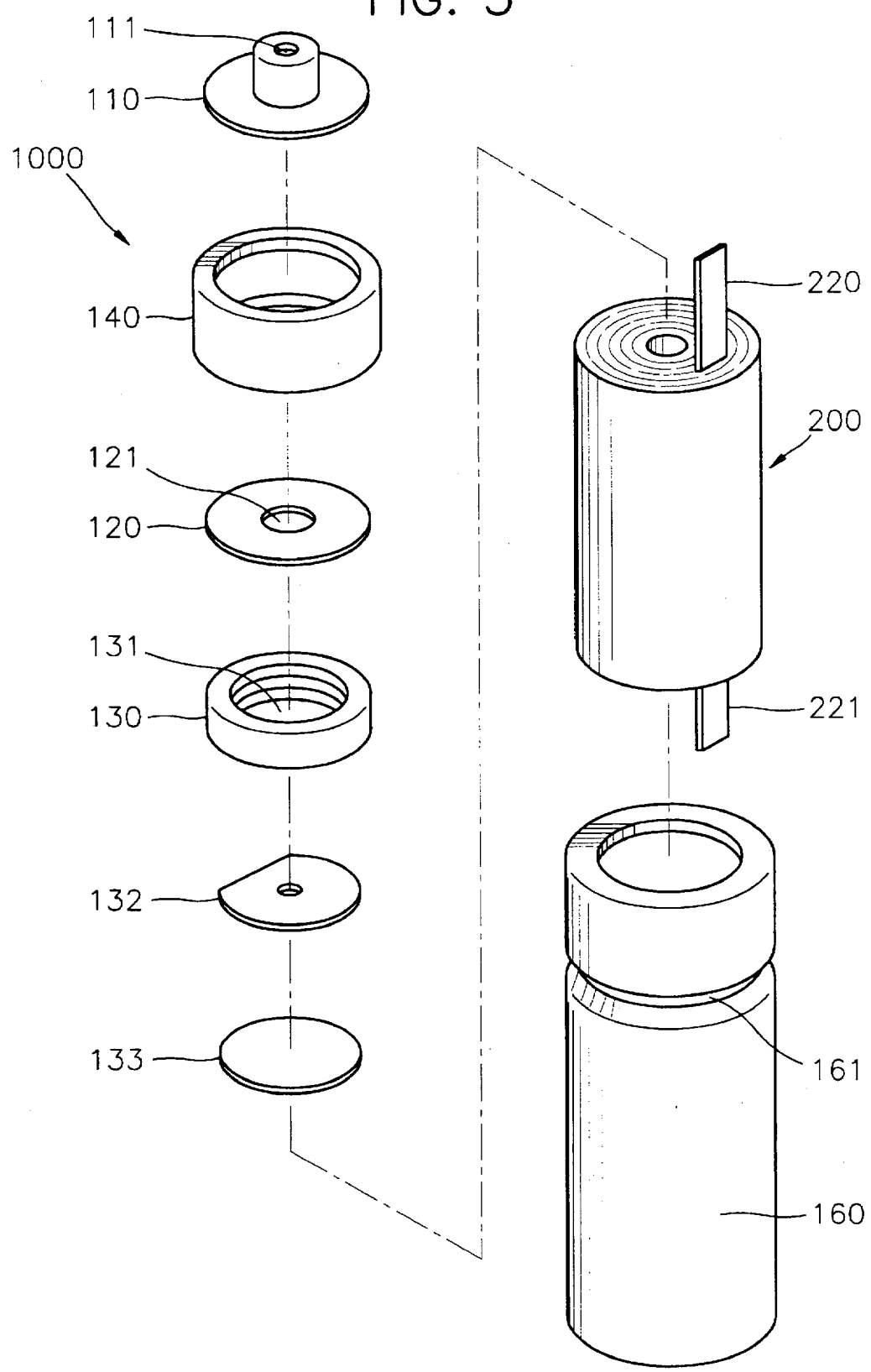
FIG. 5 is an exploded perspective view of a lithium battery according to one embodiment of the present invention.
Figure 6:
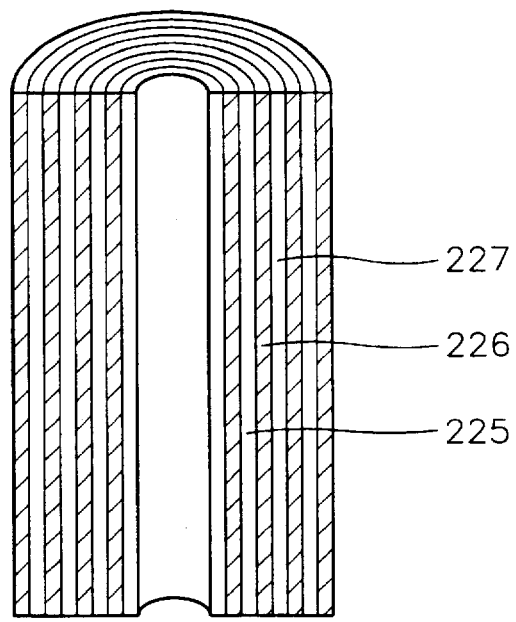
FIG. 6 is a partially cutaway perspective view of the winding assembly shown in FIG. 5.

FIG. 5 is an exploded perspective view of a lithium battery according to the present invention. FIG. 6 is a partially cutaway perspective of the winding assembly shown in FIG. 5.

With reference to FIG. 5, a lithium battery 1000 according to the present invention has a case 160. A bending portion 161 is formed at the upper portion of case 160. An electrolyte is filled below bending portion 161. A winding assembly 200 is filled in case 160. Winding assembly 200 reacts with the electrolyte, thereby generating current. The current generated is applied to a load through anode and cathode leads 220 and 221 of winding assembly 200. Cathode lead 221 is bent to make contact with the bottom surface of case 160. A cover 130 is positioned at the upper portion of case 160, wherein a through hole 131 is formed at the center of cover 130. Anode lead 220 is bent to make contact with cover 130. In cover 130, a ring plate 133 which is comprised of a plastic material and an aluminum foil 132 are provided in a stacked form. Aluminum foil 132 is easily torn to dampen the explosive force generated by the explosion of the electrolyte in case 1000.

A PTC thermistor 120 is positioned on cover 130, the resistance of which approaches infinity if the temperature of PTC thermistor 120 rises above a predetermined value, e.g., eighty degree Celsius. An opening 121 is formed at the center of PTC thermistor 120, which corresponds to through hole 131 of cover 130. The resistance of PTC thermistor 120 approaches infinity if its temperature rises above a predetermined value, so the current is cut off. A cap 110 is positioned on PTC thermistor 120, which functions as an anode terminal. A bent hole 111 is formed at the center of cap 110.

A gasket 140 for sealing the interior of case 160 is provided between the inner surface of case 160 and cap 110, PTC thermistor 120, and cover 130, and gasket 140 surrounds stacked cap 110, PTC thermistor 120, and cover 130. Case 160 is comprised of a conductive metal, and makes contact with cathode lead 221 to function as a cathode terminal. The upper end portion of case 160 is bent to fix gasket 140 at an upper portion of bending portion 161.

Winding assembly 200 (spiral electrode assembly) in case 160 chemically reacts with the electrolyte filled in case 160, thereby generating current. Winding assembly 200 is wound outwards, so that it has either a spiral shape or a cylindrical shape. In a lithium battery, it is necessary to make the reaction area as large as possible so as to obtain a relatively high voltage. Winding assembly 200 has an anode section 225 which is coated with an active material, a cathode section 227 which comprised of lithium metal, and a separator 226 between anode and cathode sections 225 and 227. Winding assembly 200 has an expanded metal applied with a material which reacts with the electrolyte (hereinafter, reactive material), and is electrically connected to anode and cathode leads 220 and 221. Winding assembly 200 is wound outwards to make the reaction area with the electrolyte large. Anode lead 220 and the expanded metal is integrally formed so as to form the anode section 225, and both sides of the expanded metal is coated with the reactive material. The reactive material is comprised of a mixture of manganese dioxide and carbon powder. The expanded metal is either a net shaped or a slitted sheet. Cathode section 227, which is comprised of a lithium metal sheet, is opposite to anode section 225. Separator 226 is comprised of a porous polypropylene film, and is provided between anode section 225 and cathode section 227.

A current is generated by the reaction of winding assembly 200 with the electrolyte. The current generated by the reaction flows through anode lead 220, cathode lead 221, cap 110, and cover 130 successively, and is applied to a load. As shown in FIG. 6, winding assembly 200 is wound spirally, wherein separator 226 is provided between anode section 225 which is comprised of manganese dioxide as an active material and cathode section 227, which is comprised of a lithium metal sheet.

Figure 7:
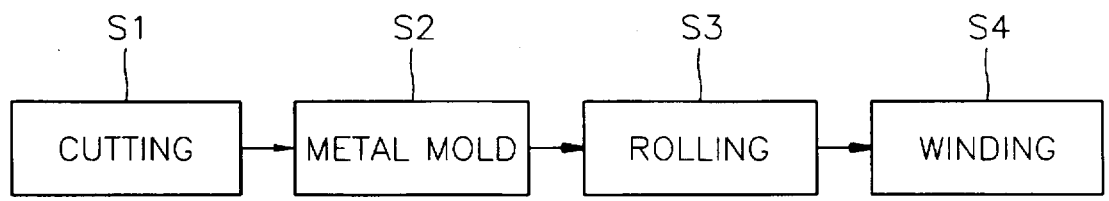
FIG. 7 is a block diagram explaining a manufacturing process of the winding assembly according to the present invention.
Figure 8:
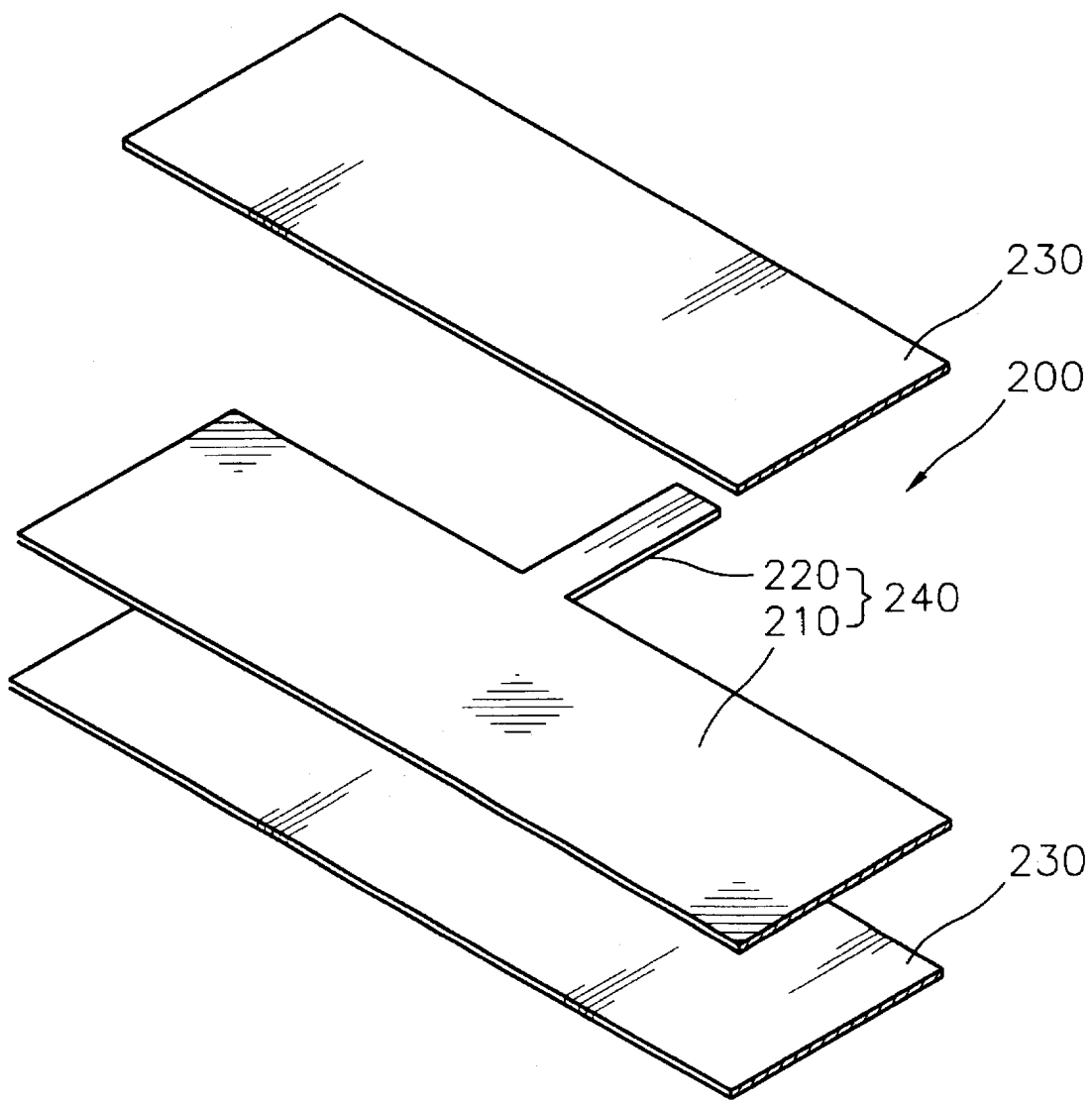
FIG. 8 is an exploded perspective view of the winding assembly for explaining the manufacturing process shown in FIG. 7.
Figure 9:
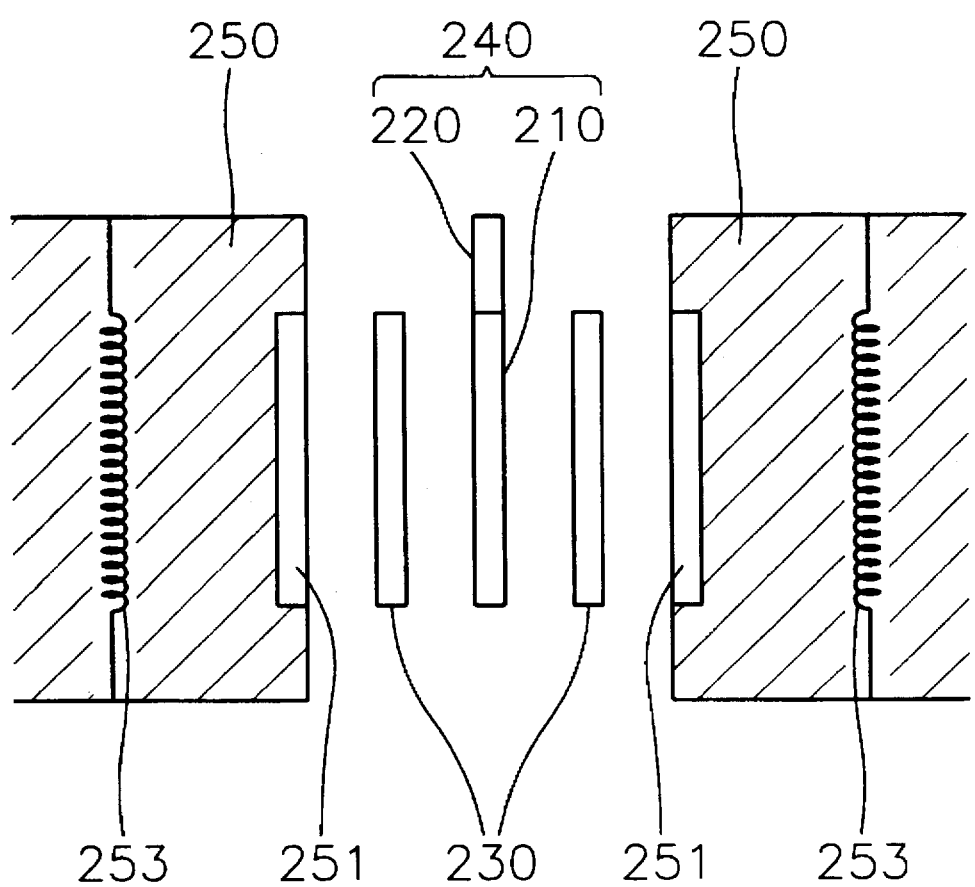
FIG. 9 is a schematic view for showing the molding step of the winding assembly shown in FIG. 8.

FIG. 7 is a block diagram explaining a manufacturing process of the winding assembly according to the present invention. FIG. 8 shows a winding assembly for explaining the manufacturing process shown in FIG. 7. FIG. 9 shows the molding step of the manufacturing process of the winding assembly shown in FIG. 7.

Winding assembly 200 is mounted in case 160 filled with the electrolyte so that winding assembly 200 reacts with the electrolyte, thereby generating current. As shown in FIG. 8, anode portion 225 is manufactured prior to the winding assembly.

As shown in FIG. 8, an expanded metal sheet, which is comprised of aluminum and has either a net shape or a slitted shape, is cut so as to form a metal sheet 240 containing expanded metal 210 and anode lead 220, which is integrally attached to expanded metal 210 (step S1). A plurality of metal sheets 240 can be manufactured in the cutting step. The locations of expanded metal 210 and electrode lead 220 of metal sheet 240 can be chosen as required. That is, metal electrode lead 220 may be located at either an upper side or a lower side of expanded metal 210.

If the manufacturing process of metal sheet 240 having expanded metal 210 and electrode lead 220 is finished, a molding step is performed (step S2). In the molding step, reactive material 230, which reacts with the electrolyte, is adhered to both surfaces of expanded metal 210.

In molding process S2, reactive material 230 is heated and pressed to be adhered to expanded metal 210 of metal sheet 240. To perform the molding step, a pair of mold blocks 250 are manufactured as shown in FIG. 9. Mold blocks 250 have recesses 251 which are opposite to each other. Mold blocks 250 are comprised of a metal which has a high thermal conductivity. Recesses 251 in mold blocks 250 are formed so that recesses 251 are the same size as expanded metal 210, i.e., have the same width as that of expanded metal 210. A heater 253 for generating heat which is transferred to mold blocks 250 is provided in each of mold blocks 250. A coil which generates heat by an electric current can be used as a heater 253. As shown in FIG. 9, reactive material 230, which reacts with the electrolyte so as to generate current, is applied to recesses 251 of mold blocks 250. Reactive material 230 is, for example, a mixture of an active material, a conductive agent, and a binder at a ratio of 85:10:5. The active material can be obtained by heat-treating manganese dioxide, which is available in the market, to within the temperature range of 250 to 450 degree Celsius. Carbon powder can be used as the conductive agent. Fluorine resin (such as 4-fluoridized ethylene resin) powder may be used as a binder.

Metal sheet 240 is interposed between mold blocks 250 coated with reactive material 230 at the recesses, and is pressure-molded. At the time, heater 253 positioned in mold blocks 250 is operated. Electrical current is applied to the coil of heater 253, thereby generating heat. Mold blocks 250 are heated by the heat generated. The temperature of the mold blocks 250 is maintained within the range of 250 to 350 degree Celsius. The heat from heater 253 is transferred to reactive material 253 when mold blocks 250 are heated, so reactive material 230 applied to recesses 25 1 of mold blocks 250 is melted. Reactive material 230 permeates into the metal net or the slit of expanded metal 230, thereby being adhered thereto. After, reactive material 230 is adhered to expanded metal 230 and after mold blocks 250 is cooled down, mold blocks 250 are separated from each other so that metal sheet 240 is relieved from mold blocks 250. After molding step (S2), metal sheet 240 coated with reactive material 230 is pressed by rollers so as to have a uniform thickness, thereby completing anode section 225 (step S3). In rolling step S3, metal sheet 240 is introduced between a pair of rollers which are rotating. Metal sheet 240 becomes flat by the pressure of the rollers so as to have a predetermined uniform thickness.

Thereafter, cathode section 227 is formed by cutting a lithium sheet so as to have a size corresponding to the size of anode electrode 225. A separator 226, comprised of an unwoven fabric of an olefin polymer such as polypropylene, is placed between cathode section 227 and anode section 225. Separator 226 is manufactured by being immersed in an electrolyte comprising an organic solvent such as a mixture of propylene carbonate and 1,2-dimethoxy ethane with a solute such as $LiBF_4$ dissolved therein. Then, the stacked structure of anode section 225, separator 226 and cathode section 227 is wound in a spiral shape, thereby completing winding assembly 200.

Thereafter, winding assembly 200 obtained in this manner is placed in case 160, and other members of the battery are assembled according to a conventional battery assembling process so as to complete a lithium battery.

In the lithium battery according to the present invention, the winding assembly is manufactured by forming an expanded metal to which an electrode lead is integrally formed, and then applying a reactive material to the expanded metal. Winding the expanded metal to which the reactive material is attached completes the winding assembly. Thus, the quantity of raw material (such as a reactive material), the number of components of the battery, and the numbers of manufacturing steps are all reduced. Further, a short in the winding assembly during the winding step is prevented.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A method of manufacturing a battery, comprising of the steps of:

providing a metal sheet having an expanded metal and an electrode lead which is integrally formed with said expanded metal;

applying a reactive material, which reacts with an electrolyte to generate current, to recesses of two mold blocks, wherein each of the recesses correspond to said expanded metal;

forming a first electrode section by positioning said metal sheet between said mold blocks, pressure-molding said metal sheet, and applying said reactive material to said expanded metal; and manufacturing a winding assembly by winding a stacked structure obtained by interposing a separator which is a thin metal plate having the same size as said expanded metal to which said reactive material is adhered, between said first electrode section and a second electrode section.

2. A method of manufacturing a battery according to claim 1, said method further comprising the step of pressing said expanded metal by using rollers so as to have a uniform thickness after adhering said reactive material to said expanded metal.

3. A method of manufacturing a battery according to claim 2, wherein said metal sheet is pressed by inserting said metal sheet between a pair of rollers which are rotated.

4. A method of manufacturing a battery according to claim 1, wherein said metal sheet is used as an anode section.

5. A method of manufacturing a battery according to claim 1, wherein a heater is provided in each of said mold blocks so that heat from said heater is transferred to said metal sheet during the pressure-molding, in order that said reactive material is adhered to said metal sheet.

6. A method of manufacturing a battery according to claim 5, wherein said heater comprises an electrical coil.

7. A method of manufacturing a battery according to claim 1, wherein said recesses corresponding to the size of said metal sheet are respectively formed on said two blocks.

* * * * *